United States Patent [19]
Cory

[11] 3,862,778
[45] Jan. 28, 1975

[54] ARRANGEMENT FOR INHIBITING ROTATION OF WHEEL RIMS ON SPOKED TRUCK WHEEL

[76] Inventor: Thornton E. Cory, P.O. Box 9950, Houston, Tex. 77015

[22] Filed: Apr. 17, 1974

[21] Appl. No.: 461,566

[52] U.S. Cl. .......................... 301/10 DC, 301/135 M
[51] Int. Cl. ............................................. B60b 11/06
[58] Field of Search ......... 301/10 DC, 13 R, 135 M, 301/11 KL

[56] References Cited
UNITED STATES PATENTS
| | | | |
|---|---|---|---|
| 1,237,614 | 8/1917 | Bryant | 301/10 DC |
| 1,521,756 | 1/1925 | Cote | 301/10 DC |
| 3,259,437 | 7/1966 | Malthaner | 301/135 M |

*Primary Examiner*—Robert S. Ward, Jr.
*Attorney, Agent, or Firm*—Jack W. Hayden

[57] ABSTRACT

Rim means engages a spoked truck wheel hub. The rim means includes an annular body with an integral annular bead projecting therefrom adjacent one edge to form a surface for seating against a truck tire edge and an annular tapered surface projects adjacent the other edge of the body in a direction generally opposite to the annular bead. Lock rim means engages the annular tapered surface to aid in retaining a truck tire on the rim and lug means engages both the spokes and the annular tapered surface on the rim means to retain the rim means in position on the spoked hub. A plurality of pairs of members are welded in position on the annular body of the rim and the tapered projecting surface with the pairs of members being spaced circumferentially of the annular body and with the members of each pair being positioned adjacent a spoke to engage the spoke upon rotation of the rim relative to the hub to prevent further rotation between the rim and the hub at a plurality of spaced circumferential points and thereby lock the rim and hub together.

4 Claims, 5 Drawing Figures

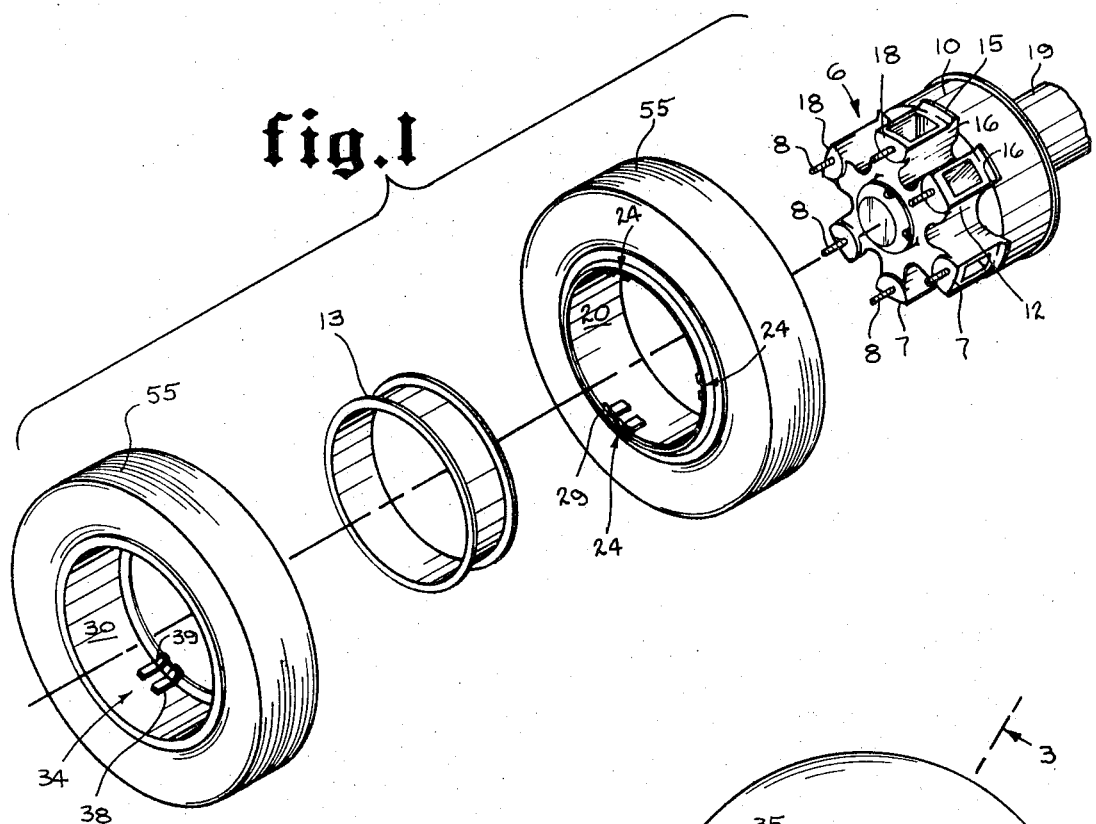
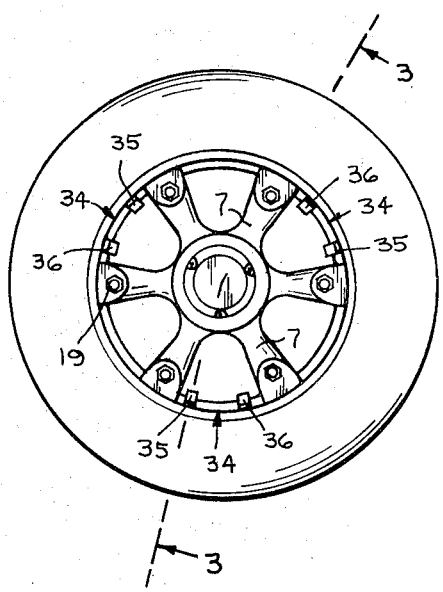
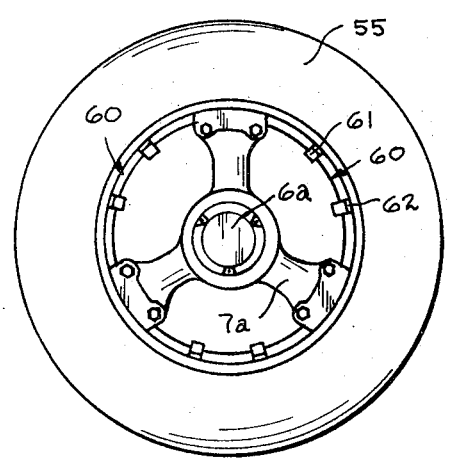

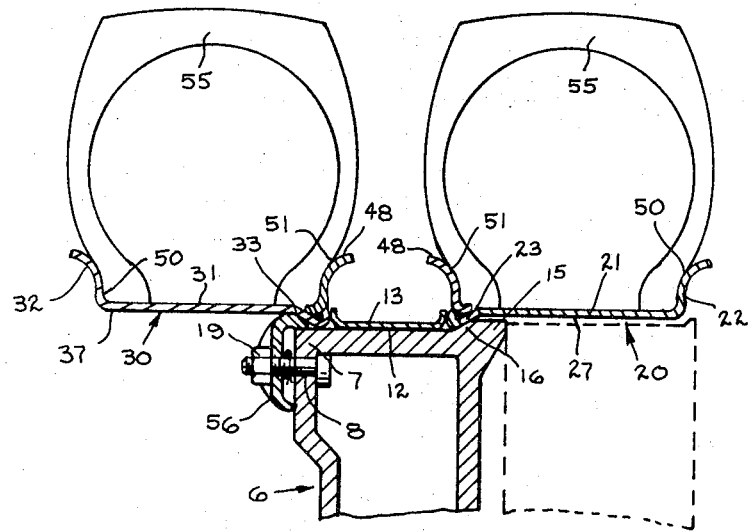
fig.3
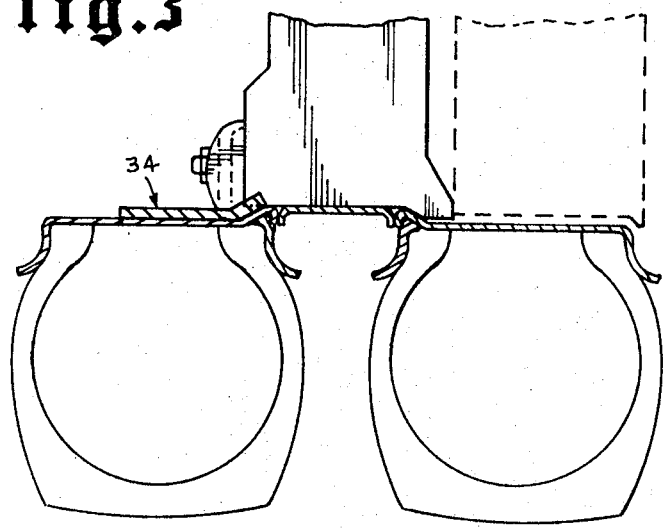
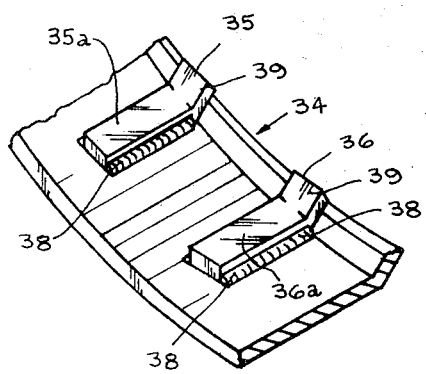
fig.4

ARRANGEMENT FOR INHIBITING ROTATION OF WHEEL RIMS ON SPOKED TRUCK WHEEL

SUMMARY OF THE INVENTION

Substantial difficulty may be encountered in maintaining truck tires and the rims on which they are carried in proper position on a spoked hub. If relative rotation occurs between the rim carrying the truck tire and the spoked hub upon which the rim is mounted the tire and mounting arrangement is generally destroyed.

By way of example only, where truck tires are mounted in tandum on a spoked hub, the spoked hub serves to support the wheel rims upon which the inflatable truck tires are carried, and a spacer rim on the hub spaces the dual tire assemblies relative to each other. Both wheel assemblies are secured to the hub by lugs and lug nuts engaging the hub and one of the wheel assemblies and should the lug nuts come loose during movement of the vehicle, rotation of the rims and supported truck tires may occur relative to the spoked hub. Such rotation generally shears the valve stem of the vehicle tires causing deflation thereof.

If only one tire deflates, the load normally carried by the dual tire assembly is transferred to only one tire and may cause substantial damage to one or both tires as well as in some circumstances completely rendering the dual wheel assembly unsuitable for further use.

An object of the present invention is to provide a relative simple arrangement for use with spoked truck hubs to inhibit rotation of a wheel rim or wheel rims relative to the spoked truck hub in an amount sufficient to permit damage.

Yet a further object of the present invention is to mount a plurality of pairs of members at circumferentially spaced positions on truck tire rims so that the members of each pair will be adjacent the spokes of the hub on which the rims are mounted so that if the lug and lug nut arrangement holding the spoked hub and wheel rims together becomes loose the wheel rims may move only a limited amount before one of the members engages circumferentially spaced spokes to thereby lock or position the rims and the spoked hub together to prevent excessive damage to the assembly.

Yet a further object of the present invention is to provide a dual truck wheel assembly including a hub having multiple spokes thereon, the hub having a surface for positioning wheel rims with tires thereon, and an annular surface for receiving a spacer rim thereon, said spacer rim engaging and spacing wheel rims relative to the longitudinal axis of the hub, said rims each having an annular tapered surface at on edge which abuts the spacer rim and which engages lugs engaged with bolts extending from each spoke. The annular tapered surface on the wheel rims also include a plurality of circumferentially spaced pairs of members, with the members of each pair being positioned adjacent a spoke in the hub so that if the nuts holding the lugs on the bolts and engaging the rims on the hub become loose, the members will engage an adjacent spoke at circumferentially spaced positions of the hub and prevent relative rotation of the wheel rims in an amount sufficient to damage the wheel assembly.

Other objects and advantages of the present invention will become apparent from a consideration of the following description and drawings.

BRIEF DESCRIPTION OF THE DRAWINGS

FIG. 1 is an exploded view illustrating a preferred embodiment of the present invention;

FIG. 2 is an end view of FIG. 3 showing the embodiment of FIG. 1 in assembled relationship;

FIG. 3 is a sectional view on the line 3—3 of FIG. 2;

FIG. 4 is a partial perspective enlarged to show the relationship of the members of each pair to each other and the rim on which they are positioned; and FIG. 5 is a perspective view illustrating the invention employed with a hub having a different number of spokes from that shown in the other Figures.

DESCRIPTION OF THE PREFERRED EMBODIMENTS

Attention is first directed to FIG. 1 of the drawings wherein a vehicle hub is referred to generally at 6. The vehicle hub 6 is shown as having six circumferentially spaced spokes each of which is referred to at 7. Each spoke 7 is provided with a threaded bolt 8 extending therefrom for engaging with a lug nut as will be described. The spoked truck hub 6 is mounted by suitable bearings on the axle 9 of the vehicle and adjacent the hub 6 is the brake drum 10. The circumferentially spaced spokes 7 each include an annular portion which in effect forms an annular surface 12 on the vehicle hub for receiving the spacer rim 13 as will be described. One annular edge 15 of each of the spokes 7 extends out of the circumferential plane of surface 12 and includes a portion adjacent the surface 12 which is tapered as illustrated at 16 for a purpose to be described in greater detail hereinafter. The other edge 18 of the spokes 7 terminates in the same circumferential plane as the portion of the spokes which defines the surface 12 upon which the spacer 13 is seated as illustrated in FIGS. 1 and 3 of the drawings.

The first rim means is referred to at 20 which is adapted to be received on the vehicle hub 6 and a second rim means 30 is also adapted to be received on the vehicle hub 6. Each the first rim means 20 and the second rim means 30 includes an annular body 21 and 31 respectively and an integral annular bead 22 and 32 respectively. The annular beads 22 and 32 extend continuously adjacent one edge of the annular bodies 21 and 31 respectively and provide a means for receiving and seating the adjacent edge 50 of a vehicle tire.

The other edges of each rim means 20 and 30 form an annular tapered edge 23 and 33 which extends continuously about the bodies 21 and 31 respectively as shown in the drawings and extends in generally a different direction from the annular projections 22 and 32 relative to the central longitudinal axis of each body 21 and 31 as shown in the drawings.

Among other things, the annular surfaces 23 and 33 provide a means for receiving and engaging the lock rim means 48 to aid in positioning the other edge 51 of the vehicle tires 55 on each rim. The lock rim means 51 is of a suitable well known construction and may be either a one piece or multiple piece lock rim configuration.

The annular surfaces 21 and 31 of the first rim means 20 and second rim means 30 respectively are adapted to receive a plurality of pairs of members 24 and 34 at circumferentially spaced points as shown in the drawings. The pairs of members 24 and 34 each include members 25, 26 forming each pair 24 and the members 35, 36 forming each pair of members 34. It will be noted that the members 24, 25, and 35, 36 are welded on the surface 27 and 37 of the first and second rim means 20 and 30 respectively which face towards the circumferentially spaced spokes 7 of the hub 6. The members are shown in greater detail in FIG. 4 and include longitudinally extending plate like members having body portions 35a and 36a of substantial longitudinal extent in relation to the longitudinal extent of the annular surfaces 27 and 37 and the portions 35a and 36a are welded to the surfaces 27 and 37 at their adjoining edges as shown at 28 and 38 respectively.

As shown in the drawings it will be noted that the members 25a, 26a, and 35a, 36a are at least approximately one-half the total width of the surfaces 27 and 37.

The outermost end portions 29 and 39 of each of the members 25, 26, and 35, 36 respectively are bent out of the plane of the portions 35a, 36a to conform with and abut the tapered surfaces 23 and 33 respectively as shown in the drawings.

When the first rim means 20 is positioned on the hub 6 as shown in FIG. 3, it will be moved upwardly over the hub until the surface 23 rests against the tapered surface 16 on the hub 6. Of course, the circumferntially spaced pairs of members 24 will be positioned between the spokes 7 of the hub and it will be noted that as illustrated in the drawings they are circumferentially spaced on the surface 27 so that they are approximately 120° apart.

Thereafter the spacer rim 13 is seated on the surface 12 formed by the spokes 7 and the second rim means 30 is then positioned on the hub 6 against the spacer rim 13 as shown in FIG. 3.

Thereafter lug means 56 are engaged with each of the bolts 8 extending from each of the spokes 7 of the hub and lug nuts 19 are then engaged with the bolts 8 to lock each of the rim means to the hub 6.

As shown in FIG. 3, the lugs 56 are configured so that when they are engaged on the bolts 8, they will engage the nether surface of the tapered portion 33 of the second rim means 30 and lock not only the second rim means against the spacer rim, but will in turn force the spacer rim 13 against the first rim means 20 to position the first rim means 20 against the tapered surface 16. This secures the first rim means 20, second rim means 30, hub 6 and spacer rim 13 together as a complete wheel assembly.

It can be appreciated that when the arrangement of the present invention supports substantial loads, the lug nuts 19 may tend to work loose. Should this occur, relative rotation between the rim means 20 and hub 6 as well as between the rim means 30 and the hub 6 could occur. Such relative rotation is extremely unsatisfactory in that it would shear the valve stems of the vehicle tires and cause deflation thereof and may cause serious damage to the vehicle tires as well as damage to the hub 6, spacer rim 13, and rims 20 and 30. Such wheel assemblies as well as the vehicle tires are extremely expensive and it can therefore be appreciated that any relative rotation between the rims and the spoked hubs is undesirable.

However, it will be noted that the members 25, 26 and the members 35, 36 are arranged at circumferentially spaced positions relative to the spokes 7 of the hub 6 and furthermore the members of each pair such as the members 25, 26 and 35, 36 are arranged adjacent hubs 7. Therefore, if relative rotation occurs the lug nuts 19 become loose and relative rotation between the rims and hub 20 should commence, the members 25, 26 and 35, 36 will immediately engage against an adjacent hub so as to prevent further rotation and damage to the wheel assembly.

It should also be noted that when the second rim 30 is positioned on the hub 6, the pairs of members 34 are misaligned circumferentially relative to the pairs of members 24 on rim means 20.

In FIG. 5, the present invention is shown as being employed where a plurality of pairs of members 60 are mounted on a hub 6a having three spokes 7a. The vehicle tires are again illustrated at 55 and the pairs of members 60 each include a member 61 and 62 having a configuration to that previously described.

From the foregoing description, it can be appreciated that the present invention provides a wheel assembly which when mounted inhibits damage to the assembly should relative rotation occur between the rim and the spoked hubs upon which the rims are mounted.

The foregoing disclosure and description of the invention are illustrative and explanatory thereof, and various changes in the size, shape, and materials as well as in the details of the illustrated construction may be made without departing from the spirit of the invention.

What is claimed is:

1. An arrangement for inhibiting rotation of wheel rims with inflatable vehicle tires thereon relative to a spoked hub including;
   a. a vehicle hub having a plurality of spokes;
   b. threaded bolt means projecting from each spoke;
   c. rim means for engaging on said spoked vehicle hub, said rim means having an annular body with an integral annular bead projecting from said body adjacent one edge thereof to form a surface for seating against a vehicle tire and an annular tapered surface projecting adjacent the other edge of said body in a direction generally opposite to said annular bead;
   d. lock rim means for engaging with said annular tapered surface to aid in retaining a vehicle tire on said rim means;
   e. lug means for engaging on said bolt means and for engaging with said annular tapered surface to retain said rim means on said spoked hub; and
   f. a plurality of pairs of spaced members welded to said annular body and abutting said tapered projecting surface, said pairs of members being spaced circumferentially of said annular body and the spaced members of each pair being adjacent a spoke whereby rotation of said rim means relative to said hub engages said one of said members of said pairs with the spokes at circumferentially spaced positions to inhibit rotation of said rim means relative to said hub.

2. The invention of claim 1 wherein said plurality of pairs of members comprises at least three pairs of members.

3. The invention of claim 1 wherein:
   1. said vehicle hub includes an annular surface;
   2. said annular surface includes an annular tapered edge;
   3. a first rim means having an annular tapered surface for seating against said annular tapered edge of said annular surface;

4. spacer rim means seated on said annular surface;
5. a second rim means having an annular tapered surface for seating against said spacer rim;
6. said first and second rim means each have said plurality of pairs of members welded thereto to inhibit rotation of each of said rim means relative said hub.

4. The invention of claim 3 wherein said first rim means is mounted on said vehicle hub so that the circumferentially spaced pairs of members are offset circumferentially relative to said pairs of members mounted on said second rim means.

* * * * *